United States Patent
Swift

(10) Patent No.: US 7,428,462 B1
(45) Date of Patent: Sep. 23, 2008

(54) METHOD FOR MANAGING WATER CHANNEL SYSTEMS

(76) Inventor: Mark S. Swift, 305 E. 29th Pl., Tulsa, OK (US) 74114

( * ) Notice: Subject to any disclaimer, the term of this patent is extended or adjusted under 35 U.S.C. 154(b) by 286 days.

(21) Appl. No.: 11/399,195

(22) Filed: Apr. 6, 2006

(51) Int. Cl.
*G01V 3/00* (2006.01)
*E02B 13/00* (2006.01)

(52) U.S. Cl. .................................... 702/2; 405/36
(58) Field of Classification Search ............... 702/2, 702/50, 81, 182, 183; 405/36, 39, 80, 118
See application file for complete search history.

(56) References Cited

U.S. PATENT DOCUMENTS

| | | | |
|---|---|---|---|
| 4,987,913 A * | 1/1991 | Kodate et al. ............ | 137/1 |
| 5,342,144 A | 8/1994 | McCarthy | |
| 5,423,226 A | 6/1995 | Hunter et al. | |
| 5,835,386 A | 11/1998 | Orr et al. | |
| 6,196,762 B1 * | 3/2001 | Stude ............. | 405/80 |
| 6,346,193 B1 | 2/2002 | Bauer | |
| 6,412,550 B1 | 7/2002 | McLaughlin | |
| 2003/0015317 A1 | 1/2003 | McLaughlin | |
| 2004/0076473 A1 | 4/2004 | Burkhart | |
| 2006/0122794 A1 * | 6/2006 | Sprague et al. ......... | 702/32 |

* cited by examiner

*Primary Examiner*—Bryan Bui
(74) *Attorney, Agent, or Firm*—Fellers, Snider, Blankenship, Bailey & Tippens, P.C.; Dennis D. Brown

(57) ABSTRACT

A method of managing a storm water or other open channel system wherein (a) the system is divided into a plurality of channel segment lengths for evaluation; (b) an inventory based upon a standardized set of items is conducted for each channel segment to identify any and each of the items which exist in the channel segment; and (c) a standardized channel condition index value is determined for each channel segment based upon the inventory.

25 Claims, 3 Drawing Sheets

CHANNEL MANAGEMENT SYSTEM
PROPERTIES BY CHANNEL REACH

Creek
FMA
Reach ID
Description

Council District
Atlas Sheet

Inspection Date
Insp. By

Does the City Perform Maintenance
On this Channel Reach?

Y/N

Access

Reach Description

D/S Sec #
Descr.

U/S Sec #
Descr.

Computed Channel Length

Adjacent Land Use for this Reach by Percent

| Single Family | Multi Family | Commercial Industrial | Open / No Structures |
|---|---|---|---|
| % | % | % | % |

Number of Adjacent Structures in Floodplain

| | Regulatory | FEMA |
|---|---|---|
| Single Family | | |
| Multi Family | | |
| Commercial/Industrial | | |
| Public Buildings | | |

Number of Adjacent Overbank Properties Affected by Channel Condition

| | Slightly Affected | Moderately Affected | Highly Affected |
|---|---|---|---|
| Houses | | | |
| Apartment/Condo Buildings | | | |
| Detached Garages/Out Buildings | | | |
| Yards | | | |
| Fences | | | |
| Other Appurtenances | | | |
| Commercial/Industrial Buildings | | | |
| Public Buildings | | | |
| Other Buildings | | | |
| Parking Lots | | | |

FIG. 2A

| Number of Infrastructure Items Affected by Channel Condition | | | | |
|---|---|---|---|---|
| | Not Affected | Slightly Affected | Moderately Affected | Highly Affected |
| Side Headwall/Outfall | | | | |
| Weir/Blocks/Drop | | | | |
| Roadway (LF) | | | | |
| Bridge Abutment | | | | |
| Bridge Pier | | | | |
| Culvert Wingwall | | | | |
| Culvert Apron/End | | | | |
| Pipe Culvert | | | | |
| Low Water Crossing | | | | |
| Other Structure | | | | |

| Public Utilities | | Private Utilities | |
|---|---|---|---|
| Sanitary Sewer Line Exposed (LF) | | # of Gas Line Exposures | |
| # of San. Sewer Manholes Exposed | | # of Electric Line Exposures | |
| Water Line Exposed (LF) | | # of Other Util. Exposures | |

Channel Conveyance Condition

| | | | | |
|---|---|---|---|---|
| # of Trees with Exposed Roots | | | | |
| # of Trees in Immediate Danger of Falling | | | | |
| # of Trees Down in Channel | | | | |
| | | Slight | Moderate | Severe |
| Trees/Brush/Undergrowth Impeding Flow (LF) | | | | |
| Drift Accumulation Impeding Flow (LF) | | | | |
| Bank Erosion/Scour (LF) | | | | |
| Bottom Scour (LF) | | | | |
| Sediment Deposition (LF) | | | | |

| Improved Channel Condition (LF) | | | | |
|---|---|---|---|---|
| | Good Condition | Slight Defects | Moderate Defects | Severe Defects |
| Concrete Side Slopes | | | | |
| Concrete Bottom | | | | |
| End of Concrete Channel | | | | |
| Trickle Channel | | | | |
| Rip Rap | | | | |
| Rip Rap, Grouted | | | | |
| Gabion | | | | |
| Interlocking Blocks | | | | |
| Fabric Formed Concrete | | | | |
| Retain Wall, Concrete | | | | |
| Retain Wall, Masonry | | | | |
| Retain Wall, Timber | | | | |
| Other | | | | |

Comments

FIG. 2B

METHOD FOR MANAGING WATER CHANNEL SYSTEMS

FIELD OF THE INVENTION

The present invention relates to methods of managing open water channel systems.

BACKGROUND OF THE INVENTION

A need exists for an effective method which can be used by municipalities, counties, companies, landowners, and others for managing open water channel systems. Such systems typically comprise a collection of inter-connected channels which must be inspected, serviced, maintained, and sometimes improved. A method is needed which will be effective for assisting the municipality or other entity in identifying, prioritizing, and organizing individual service projects, maintenance projects, and capital improvement projects throughout the channel system.

Examples of service needs within an open channel system commonly include, but are not limited to, dealing with problems related to trees, brush, undergrowth, erosion, scour, sedimentation, debris accumulation, and other natural conditions. In addition to such service needs, channel improvement structures often need to be repaired, replaced, or added to the channel system. Examples of typical channel improvements include, but are not limited to, concrete side slopes and/or bottoms, trickle channels, rip rap, gabion, and retaining walls.

A need exists for an open channel management method which will not only assist in organizing and prioritizing service, maintenance, and improvement projects in terms of addressing flow problems and improving flow conditions within the channel system, but which will also account for the effect or potential effect of such channel conditions or improvements on any adjacent over bank properties, adjacent infrastructure, and public or private utilities. A need also exists for a system which will enable communities or other entities to easily and efficiently obtain an overview of the condition of the open channel systems in their care and to quickly prepare visual and tabular reports in the particular form desired.

SUMMARY OF THE INVENTION

The present invention satisfies the needs discussed above. In one aspect, there is provided a method of managing a system of open channels for evaluating channel conditions, servicing the open channels, maintaining the open channels, improving the open channels, or a combination thereof. The method comprises the steps of: (a) dividing the system of open channels into a plurality of channel segments for evaluation; (b) conducting for each channel segment an inventory based upon a standardized set of items to identify any and each of said items existing in the channel segment; and (c) determining a standardized channel condition index value for each channel segment based upon said items existing in the channel segment.

In the inventive method, the step of determining a standardized channel condition index value for each channel segment also preferably includes applying standardized weighting multipliers to said items existing in the channel segment to provide a set of weighted item values for the channel segment. In addition, the step of determining the standardized channel condition index value for each channel segment preferably comprises calculating a total of the set of weighted item values for the channel segment. Further, the step of determining a standardized channel condition index value for the channel segment also preferably includes dividing the total of the set of weighted item values for the channel segment by a length of the channel segment. It is also preferred that the inventive method include the step of ranking the channel segments according to the standardized channel condition index values for the channel segments.

In another aspect, the present invention provides a method of managing a system of open channels for evaluating channel conditions, servicing the open channels, maintaining the open channels, improving the open channels, or a combination thereof, wherein the method comprises the steps of: (a) dividing the system of open channels into a plurality of channel segments for evaluation; (b) conducting for each channel segment an inventory based upon a standardized set of items to identify any and each of said items existing in the channel segment; (c) assigning ratings to at least a portion of said items existing in the channel segments based upon standardized ratings scales; and (d) determining a standardized channel condition index value for each channel segment based upon said items existing in the channel segment and the ratings assigned to the portion of said items. The step of determining a standardized channel condition index value for each channel segment preferably also includes employing standardized weighting multipliers to the items existing in the channel segment to provide a set of weighted item values for the channel segment, wherein the standardized weighting multipliers applied to the above-mentioned portion of the items are dependent upon the ratings assigned to the portion of the items.

In another aspect, there is provided a method of managing a system of open channels comprising the steps of: (a) dividing the system of open channels into a plurality of channel segments; (b) conducting for each said channel segment an inventory based upon a standardized set of items to identify any and each of the items existing in the channel segment; and (c) assigning ratings to at least a portion of the items existing in the channel segments based upon standardized ratings scales and instructions.

Further aspects, features, and advantages of the present invention will be apparent to those in the art upon examining the accompanying drawings and upon reading the following detailed description of the preferred embodiments.

BRIEF DESCRIPTION OF THE DRAWINGS

FIG. 2A is an example of first portion of a standardized channel segment inspection form preferred for use in the present invention.

FIG. 2B is a second portion of the standardized channel segment inspection form.

DETAILED DESCRIPTION OF THE PREFERRED EMBODIMENTS

Figure 1:
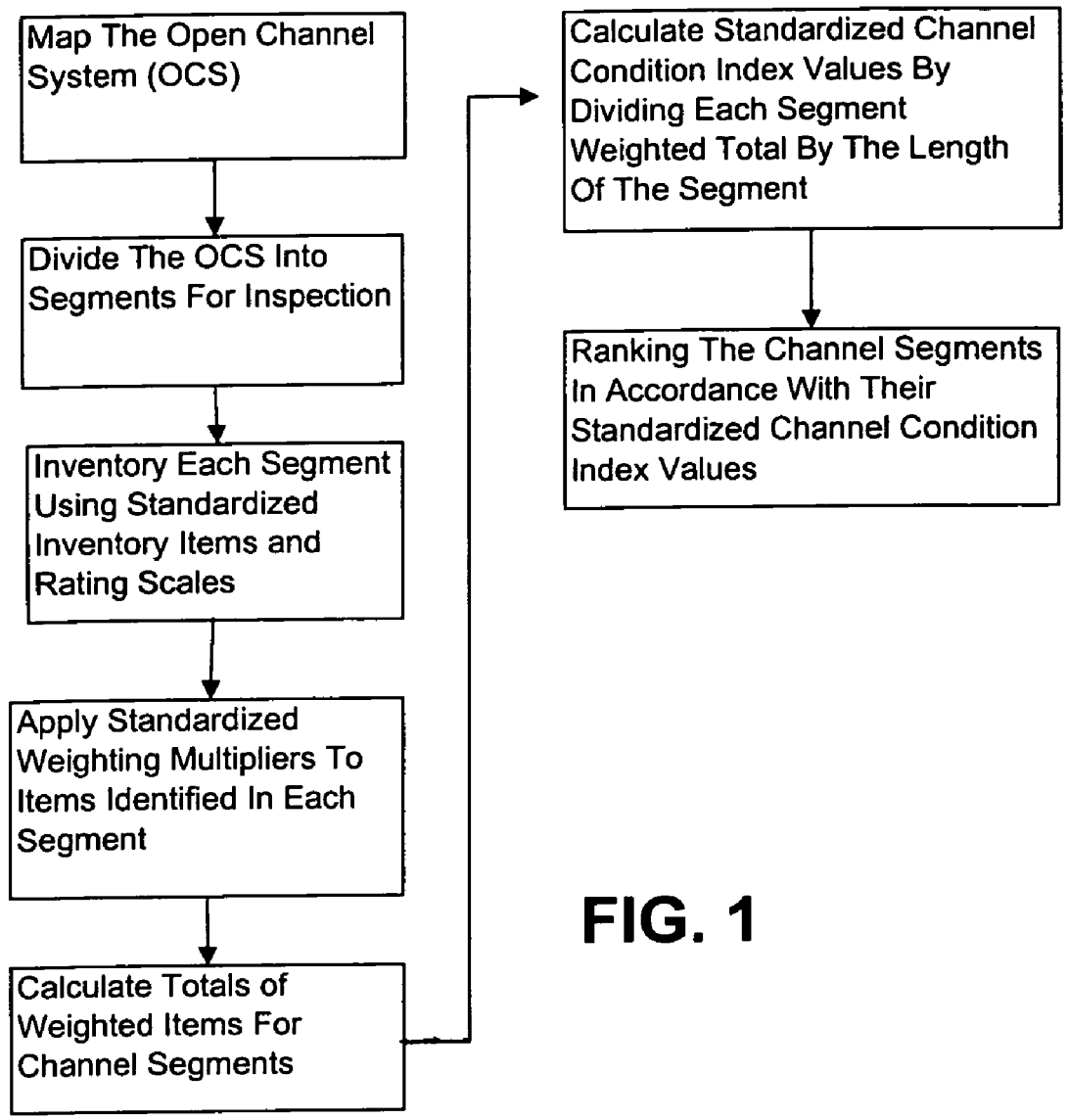
FIG. 1 is a flow chart of an embodiment of the inventive channel management method.

The present invention provides a comprehensive method for inspecting, quantifying, tabulating and analyzing the different elements which make up natural and improved channels within a municipality or other area. The method provides: (a) a methodology for subdividing the open channels into individual reaches or other segments with similar properties; (b) a standardized methodology for performing a field inspection and inventory of the individual segments using a consistent, standardized procedure for identifying relevant elements and assigning condition state values for the elements found in each segment; (c) a database using, e.g., Microsoft Access or other system to store the data accumulated for each segment; (d) the ability to run queries within the database for retrieving and presenting the data in a variety of meaningful ways; and (e) a procedure for geo-referencing the individual segments in the database so that their attributes can be mapped and visualized (e.g., using a graphic information system (GIS) system). Moreover, in the inventive method, a standardized channel condition index value is determined for each channel segment. The standardized channel condition index values for the channel segments can be used along with the other data gathered and the analyses and reports generated by the inventive system for evaluating and prioritizing needed service projects, maintenance, and capital improvements throughout the entire open channel system.

If an adequate mapping system does not already exist, a preferred initial step of the inventive method is to accurately define the channel centerlines and establish a river stationing system for the area in question. As will be described more fully hereinbelow, current topographical aerial photos or other sources or materials can be used for tracing the channel centerlines. The aerial photos, with topographic information, can be fed into an AutoCAD system and the flow lines of the system channels can be traced from their downstream confluence to their upstream limit.

The overall channel lengths are preferably then divided into manageable reaches (i.e., segments) and a standardized naming procedure is applied. If a system within a municipality or other area has already been broken down into flood management areas or other divisions, these divisions can often provide the starting point for dividing the channel system and can also form the basis for the naming procedure.

For example, if a particular section of the channel system is known as Swift Creek (SC) basin and the SC basin includes 16 flood management areas, these flood management areas could be designated as SC-01 through SC-16. Some or all of these flood management areas could then be further divided into a plurality of reaches/segments. These divisions will preferably coincide with significant differences in channel configurations and characteristics existing within the flood management area. Thus, for example, the flood management area SC-05 might be divided into three segments (SC-05-A through SC-05-C) wherein the first segment SC-05-A might be a segment having concrete side slopes, the next segment SC-05-B, might be a natural channel segment with no improvements, and the next segment, SC-05-C, might be a segment having rip rap side slopes.

In some cases, significant changes in channel configurations can be discerned by examining aerial photographs. Thus, it will be possible in many cases to at least begin the division of the channel system into relevant segments using aerial photos and/or other drawings, information, or data. However, it will typically be necessary in most cases to confirm at least some of the segment boundaries during the field inspections of the channel segments discussed hereinbelow.

As will be described below, the inventive method employs a standardized inventory procedure for inspecting each of the channel segments of the open channel system and for determining a standardized channel condition index value for each segment. The standardized inventory is based, at least in part, on a predetermined set of possible conditions, features, and other items which may be present in the channel segments. At least some of the items contained in the inventory list could also serve as examples of possible bases for distinguishing different portions of a given channel system for dividing the channel system into manageable segments.

A flow chart outlining an embodiment of the inventive channel management method is provided in FIG. 1. In the inventive method, a field inspection is preferably conducted using a standardized form which includes a list of predetermined items relevant to determining the relative condition of each segment in question. A separate copy of the form will preferably be used for inspecting each individual segment and the personnel conducting the inspection will identify the type and quantity of each item listed on the form which is/are found in the segment.

An example of a standardized inspection form for use in the inventive method is provided in FIGS. 2A and 2B. The items listed on the form are used for determining the condition of the channel segment in question and for ranking all of the channel segments within the channel system with regard to the priority of needed service, maintenance, and improvements. The types of items contained in the list include: adjacent land use factors; adjacent structures in the flood plane; adjacent over-bank properties affected by the channel condition; infrastructure items affected by the channel condition; public utilities; private utilities; natural channel conveyance conditions; and the condition of existing channel improvements. The form also includes standardized ratings scales for most of the items listed.

The first block of the standardized channel reach inspection form pertains to the precise identification of the channel segment in question and will preferably be completed in accordance with the standardized procedures and criteria set forth in Table I.

TABLE I

Standardized Instructions for Completing the Reach/Segment Identification Block of the Standardized Inspection Form

| | |
|---|---|
| Creek | Name of Creek |
| FMA | Flood Management Area (for example, SC-1, SC-2, etc.) |
| Reach ID | Reach designation (A, B, C, etc.) |
| Description | Provide a brief description of the Reach. Put in anything pertinent, for example, "Natural Channel," "Subdivision Improved Channel," :Harvard Avenue RCB," etc. |
| Council District | From Council District Map |
| Atlas Sheet | From the Storm Sewer Atlas Sheet |
| Inspection Date | Date of field inspection |
| Insp. By | List the team members of the field inspection crew |
| Does the City Perform Maintenance on this Channel Reach? | Enter Yes or No depending on whether or not the City performs major maintenance functions on this reach. Note: the City may perform major maintenance functions even if not responsible for routine mowing and clearing. |
| Access | Describe if access is available to the channel reach by heavy equipment. Enter "by ramp on left bank, " "none," "across yard," etc. |

The next block of the reach/segment inspection form pertains to the description of the reach in question and will preferably be completed in accordance with the standardized procedures and criteria set forth in Table II.

TABLE II

Instructions For Completing the Reach/Segment Description Block of the Standardized Reach Inspection Form

| | |
|---|---|
| Reach Description | Enter information about the reach being inspected. Information includes the upstream and downstream reach section number that is equal to the channel centerline stationing. |
| D/S Sec ft | Down Stream section # of the Reach, taken from the plot which shows the channel centerline and stationing |

TABLE II-continued

Instructions For Completing the Reach/Segment Description Block of the Standardized Reach Inspection Form

| | |
|---|---|
| Descr. | Brief description of the Down Stream section, for example, "beginning of rip-rap," "beginning of natural channel," "FMA boundary," etc. |
| U/S Sec # | Up Stream section # of the Sub-Reach, taken from the plot which shows the channel centerline and stationing |
| Descr. | Brief description of the Up Stream section, for example, "end of concrete side slopes," "end of gabion on left bank," "FMA boundary,: etc. |
| Computed Channel Length | U/S Sec #minus D/S Section #. This gives the Sub-Reach channel length. |

The next block of the standardized channel segment inspection form pertains to the identification and characterization, by percent, of the type of adjacent land use for the segment in question. This block of the form will preferably be completed in accordance with the standardized procedures and criteria set forth in Table III.

TABLE III

Instructions For Completing The Adjacent Land Use Block of the Standard Reach/Segment Inspection Form

| | |
|---|---|
| Adjacent Land Use for This Reach by Percent | Enter the percentage of the reach that has the following land use types on the adjacent overbanks. The land use type on both overbanks should be calculated. For example: the left overbank is Single Family (50%), and half of the right overbank is Multi Family (25%), and half is Open (25%). |
| Single Family | Single family residential neighborhood, or individual housing |
| Multi Family | Apartment buildings, duplexes, including parking lots, etc. |

TABLE III-continued

Instructions For Completing The Adjacent Land Use Block of the Standard Reach/Segment Inspection Form

| | |
|---|---|
| Commercial/Industrial | Any commercial or industrial developments, including parking lots. |
| Open/No Structures | Open fields without structures, like parks, golf courses, vacant lots, etc. |

The next block of the standardized inspection form pertains to the number and type of structures adjacent to the segment in question which are in either a regulatory floodplain or a FEMA floodplain. This block of the form will preferably be completed in accordance with the standardized procedures and criteria set forth in Table IV.

TABLE IV

Instructions For Completing the Adjacent Structures in Floodplain Block of the Standardized Reach Inspection Form

| | |
|---|---|
| Number of Adjacent Structures in Floodplain | Enter the number of insurable structures (excluding detached garages, outbuildings, etc.) that are within the Regulatory and FEMA floodplains. |
| Single Family | Single family residential structures |
| Multi Family | Multi family apartment buildings, duplexes, etc. |
| Commercial/Industrial | Any commercial or industrial building, include churches in this category |
| Public Buildings | Any public building |

The next block of the standardized channel reach inspection form pertains to the number and type of adjacent overbank properties affected by the channel condition. A rating scale of "slightly affected," "moderately affected," or "highly affected" is provided for each overbank property item identified. This block of the standardized form will preferably be completed in accordance with the standardized procedures and criteria set forth in Table V.

TABLE V

Instructions For Completing The Adjacent Overbank Properties Block Of The Standardized Reach/Segment Inspection Form

| | | | |
|---|---|---|---|
| Number of Adjacent Overbank Properties Affected by Channel Condition | Note: Enter the number of properties that are adversely affected by the channel condition. Enter only structures that are "Slightly," "Moderately," or "Highly," affected. Do not enter structures that are remote from the channel bank and not adversely affected. | | |
| | Slightly Affected | Moderately Affected | Highly Affected |
| Houses Apartment/Condo Buildings Detached Garages/Out Buildings | Immediately adjacent to the channel bank, even if the bank is stable. | Erosion or sloughing of the channel bank may soon endanger the structure. | Erosion or sloughing of the channel bank is an immediate danger to the structure. |
| Yards | Count any yard that is immediately adjacent to the top of the | Erosion of the channel bank has encroached onto the yard. | Erosion of the channel bank is sever and has greatly |

TABLE V-continued

Instructions For Completing The Adjacent Overbank Properties Block Of The Standardized Reach/Segment Inspection Form

| | | | |
|---|---|---|---|
| | channel bank, even if the bank is stable | | encroached onto the yard. |
| Fences | Fence on top of channel bank, and may need a little work soon to protect it. | Fence posts are exposed due to erosion of the channel bank. Needs attention to halt the damage, but is not in immediate danger of collapsing. | Fence posts are exposed; fence is leaning and may soon fall down. Needs immediate attention or has already fallen. |
| Other Appurtenances | Garden sheds, brick/stone cookers, gazebos, green houses, etc. Rate the same as Houses | | |
| Commercial/Industrial Buildings | Any commercial or industrial building, include Churches in this category. Rate the same as Houses. | | |
| Public Buildings | Any public building. Rate the same as Houses. | | |
| Other Buildings | Any building not described above. Rate the same as Houses | | |
| Parking Lots | Parking lot is immediately adjacent to the channel bank, even if the bank is stable | Erosion or sloughing of the channel bank may soon endanger the parking lot. | Erosion or sloughing of the channel bank is an immediate danger to the parking log. |

The next block of the standardized channel segment inspection form pertains to the type and number of infrastructure items affected by the channel condition. A standardized rating scale of "not affected," "slightly affected," "moderately affected," or "highly affected" is provided for each infrastructure item identified. This block of the channel segment inspection form will preferably be completed in accordance with the standardized procedures and criteria set forth in Table VI.

TABLE VI

Instructions For Completing The Infrastructure Items Affected Block of the Standardized Reach/Segment Inspection Form Number of Infrastructure Items Affected by Channel Condition Each of the following items found within the channel reach should be counted and placed in the appropriate "condition state" category

| | Not Affected | Slightly Affected | Moderately Affected | Highly Affected |
|---|---|---|---|---|
| Side Headwall/Outfall Include: Only count storm sewer headwalls/outfalls on the side of the main channel. Count storm sewer headwalls, pipe ends w/o headwalls, and outfalls for tributaries. | Headwall/Outfall in good, stable condition. | Downstream face of headwall/outfall apron is exposed, but not undercut. May be erosion behind wings, but generally in serviceable condition. | Headwall/outfall apron is undercut by erosion. No joint separation or headwall failure. Serviceable condition, but in need of work to stop the deterioration. | Joint separation and/or separation of headwall from storm sewer pipe. Headwall or apron rotated or fallen in. Headwall/outfall has failed. |
| Weir/Blocks/Drop Include: Weirs Energy Dissipaters Drops in channel elev. | No defects. Structure is in good working order. | Chipping, spalling, cracking, or other minor defects. There is no rotation or settlement. Footing may be exposed but is not undercut. Structure in serviceable condition. | Severe chipping, spalling, cracking, or other defects are present. -or- Structure has rotated and/or shows some settlement. -or- Footing is exposed and undercut. | Structure has failed. Severe defects and/or missing sections. |
| Roadway (LF) Count the length of Roadway that is immediately adjacent to the creek channel. | No defects. Roadway is in good condition. Curb, if present in good condition. | Roadway edge or curb shows slight defects. May be chipping, spalling, or "drop-off" present, but it does not affect the | Roadway edge or curb shows moderate defects. Bank erosion has undercut the edge of the roadway resulting in | Roadway edge or curb has failed. Bank erosion has caused severe spalling or sloughing that represents a |

TABLE VI-continued

Instructions For Completing The Infrastructure Items Affected Block of the Standardized Reach/Segment Inspection Form

| | | serviceability of the roadway. | spalling or "drop-off." There is an inconvenience to traffic on the roadway. | hazard to traffic on the roadway. |
|---|---|---|---|---|
| Bridge Abutment Count each bridge abutment in the reach. | Bridge abutment in good condition with no visible defects. | Abutment in good overall condition, but there are slight defects. May be some exposure of the footing and minor cracking. | Abutment may show cracks and exposure of footing. Abutment in overall serviceable condition. No shifting or rotation. | Abutment has severe cracking, exposure and undercutting of footing, shifting/rotation that affects its function. |
| Bridge Pier Count each individual bridge pier as one. Count each culvert interior wall as one. | No defects visible. | Bridge pier in good serviceable condition. May be some spalling or minor cracking. Scour may have exposed the footing. | Cracking and/or spalling may be more pronounced. Scour may have exposed the footing. No settlement or rotation. | Bridge pier may have settled or rotated enough to endanger the bridge structure. Spalling and/or cracking are severe. Scour may have undercut the footing. |
| Culvert Wingwall Includes: Each culvert wingwall found on a structure that crosses the main channel centerline. | Wingwall has no defects. | Wingwall has slight cracking or spalling. Footing may be exposed, but is not undercut. No rotation or settlement. | Wingwall has cracking thru the wall or severe spalling. Footing may be undercut. Wingwall is still functional. | Wingwall has separated from the bridge structure, or rotated such that its function is compromised. |
| Culvert Apron/End Includes: Each culvert apron or end of culvert if apron is not present. Only on structures that cross the main channel centerline. | Apron/End in good condition with no defects. End is not scoured. | Apron/End shows slight spalling or cracking. End may be exposed, but is not undercut. | Apron/End has more severe cracks and/or spalling or has been undercut by scour. | Apron/End has cracking or spalling so severe that the structure has failed. Apron may have separated from the culvert and settled or rotated. |
| Pipe Culvert Includes: Each pipe culvert found on-line with the main channel centerline. | Pipes and headwall in good condition. No defects. | Pipes and headwalls may have slight spalling of edges. Headwall is solid and effective. No settlement. | Pipes and head-wall have significant cracking and/or spalling. Headwall has significant defects. There may be slight settlement. | Pipe culvert system has significant settlement, or significant defects that affect the function of the system. |
| Low Water Crossing Includes: Each low water crossing that crosses the main channel centerline. | Low water crossing in good condition. No visible defects that affect the structures' condition. | Low water crossing still fully functional, but there are slight defects in the material making up the crossing. No settlement of roadway or low flow pipes. | Serviceability of the low water crossing is affected by erosion, or a deterioration of the material making up the crossing. | Low water crossing is not functional due to erosion or deterioration. |
| Other Structure Include: Any other structure found in the channel that is not described above. | Structure is in perfect condition without defects. | Structure has slight defects, but the functionality is not affected. | Structure has moderate defects that affect the functionality, but it is still serviceable. | Structure has failed and is not functional. |

The next block of the standardized inspection form pertains to any public or private utilities associated with the channel segment in question and will preferably be completed in accordance with the standardized procedures and criteria set forth in Table VII.

TABLE VII

Instructions For Completing The Public And Private Utilities Block Of The Reach/Segment Inspection Form Public Utilities Public utilities in this program include sanitary sewer lines, manholes, and waterlines. There are no condition states for the exposed utility, only the linear footage of the exposed line, or the number of affected manholes. Use the plotted maps to help locate the general alignment and look for exposed lines.

| | |
|---|---|
| Sanitary Sewer Line (Exposed) LF | Count the total linear footage of sanitary sewer line that is exposed within the channel banks. Sanitary sewer line is usually made of Reinforced Concrete Pipe (RCP), cast iron pipe, or red clay pipe. Sometimes sanitary sewer lines will be fully encased in concrete as it crosses the bottom of the channel. In this case, count the length of concrete encasement. The linear footage of exposed service lines from the main line should also be counted. These lines are usually 4" Cast Iron Pipe or may be PVC, and run from the main line across the channel to a residence. Count the total linear footage of exposed line, even if the line is intentionally exposed (set in concrete thrust blocks, or encased in concrete at the bottom of the channel). |
| # of Sanitary Sewer Manholes Exposed | Count the number of sanitary sewer manholes that are exposed. Manholes are usually cylindrical, pre-cast concrete, or brick with grouted coating. There should be a manhole cover on top stamped "Sanitary Sewer." Count each manhole that is exposed within the channel banks. |
| Water Line Exposed (LF) | Count the total linear footage of water line exposed within the channel banks. Waterlines in the channel are generally made of black ductile iron pipe, although PVC pipe may also be seen. Usually, waterlines crossing the channel will be found parallel to roadway crossings, but not always. Waterlines may be confused with gas lines, so refer to the plotted maps for general alignments. |

Private Utilities

Private utilities in this program include gas lines, gas meters, buried electric lines, telephone (utility) poles, telephone risers, telephone lines, cable TV risers, cable TV lines, etc. There are no condition states for the exposed utility, only the number of exposed lines, or the number of utility poles, risers, meters, etc.

| | |
|---|---|
| # of Gas Line Exposures | Count the number of gas lines exposures. Gas lines could be made of black pipe, ductile iron pipe, or orange Poly Propylene Flexible Pipe. The pipe may be painted black, yellow or orange. The pipeline may cross the channel or run parallel to it. Count each exposure of a gas line, no matter how long, as one exposure; do not count the linear footage of the line. Also, count an exposed gas meter as one exposure. |
| # of Electric Line Exposures | Most electric line exposures will be a utility pole within the channel. Count each pole within the channel as one exposure. Also count the number of electric line exposures. Electric lines are generally encased in gray PVC pipe, or gray Romex line. Only count a single line as one exposure. Do not count the linear footage of the exposed line. |
| # of Other Utility Exposures | Other utility exposures include cable TV lines, telephone lines, telephone risers, etc. Count each cable, riser, etc., as one exposure. When unable to positively determine the nature of the exposed element, put it in this category. |

The next block of the standardized inspection form pertains to the number and type of natural channel conveyance conditions identified for the segment in question. A rating scale pertaining to the condition of trees having exposed roots or which have fallen or are in immediate danger of falling is provided. A standardized rating scale of "slight," "moderate," and "severe" is provided for other condition items listed in the block. This block of the form will preferably be completed in accordance with the standardized procedures and criteria set forth in Table VIII.

TABLE VIII

Instructions For Completing The Channel Conveyance Condition Block Of The Standardized Reach/Segment Inspection Form Channel Conveyance Condition This category includes naturally occurring elements that affect the conveyance of water through the channel. Trees within the channel will be categorized and individually counted. In addition, the linear footage, along the centerline of the channel, of other naturally occurring elements will be counted and classified.

| | |
|---|---|
| Not Counted | Do not count trees that are less than 6 in. diameter. Do not count trees that have adequate protection at the roots, either natural earth, or stones, or timbers, etc. |
| # of Trees with Exposed Roots | Count the number of trees within the reach that have exposed roots and are within the channel banks. Roots will be visible due to erosion, scour or sloughing. The tree itself will be stable, not undermined, and still solidly founded in the reach. Count the total number of trees in this classification that are within the reach. |
| # of Trees in Immediate Danger of Falling | Count the number of trees within the reach that are in immediate danger of falling. These trees will have scour that has cut under the main trunk of the tree, suspending the main trunk in the air. Also count trees in this category if it looks like a little more scour will cause the tree to fall. |
| # of Trees Down in Channel | Count the number of trees within the reach that are actually down in the channel, or are being kept up only by leaning on other trees. Newly fallen or main trunks that may have fallen a long time ago will be counted. |

The following 5 elements refer to natural conditions that obstruct the flow of water in the channel. The linear footage of each element should be counted along the centerline of the channel. For example, if Bottom Scour occurs in part of the channel for a length of 85 feet, place 85 in the appropriate classification. However, if bank erosion occurs on the left bank for a length of 50 feet, and also on the right bank for a length 25 feet, place a total of 75 in the appropriate classification. Only classifications of Slight, Moderate or Severe should be counted.

| | Slight | Moderate | Severe |
|---|---|---|---|
| Trees/Brush/Undergrowth Impeding Flow (LF) | Slight vegetation along the side of the channel, but the channel bottom is clear of any obstruction. One side may be heavier than the other side, but the overall obstruction is slight. | Vegetation encroaching on the main channel bottom. Moderate vegetation on both sides, or a few mature trees within the channel. | Vegetation blocking the main channel, including the bottom. Or, heavy vegetation on both sides encroaching well within the channel bottom. |
| Drift Accumulation Impeding Flow (LF) | Drift present, but not in great quantity. Drift covers a small percentage of the channel cross section, up to 10% | Considered a drift pile that is of significant height. The drift is considered Moderate if it blocks up to 50% of the channel width. | Again, considering a drift pile that is of significant height, the drift pile is Severe if it blocks over 50% of the channel width. |
| Bank Erosion/Scour (LF) Count the linear footage of bank erosion or scour that occurs on each bank. Therefore, the total bank erosion/scour could equal up to 2 times the total reach length. | Unprotected, bare earth limited to near the normal water line, but not very far up the bank. There may be exposed roots but the erosion/scour is not very significant. | Scour/erosion has progressed up the bank, but has not yet reached the top of the channel. This erosion/scour is typically convex or flat in appearance. Exposed roots are typical. | Scour/Erosion is at the top of the channel bank, or, if near the top, the scour/erosion is concave in appearance. Overhanging roots are typical. |
| Bottom Scour (LF) | Located on the bottom of the channel, scour is evident, but not severe enough to threaten any channel components. Sides are not undercut. | Bottom scour is evident and has barely undercut, or is otherwise threatening other channel components. Bottom scour is less than 2' deep, if measurable. | Bottom scour is threatening other channel components. Bottom scour is greater than 2' deep, if measurable. |

TABLE VIII-continued

Instructions For Completing The Channel Conveyance Condition Block Of The Standardized Reach/Segment Inspection Form

| | | | |
|---|---|---|---|
| Sediment Deposition (LF) | Small amount of sediment is visible on the channel bottom, but it results in no loss of the channel's ability to convey water. Sediment is composed of small rocks or sand with no vegetation. | Sediment results in a moderate loss of channel conveyance up to 25%. Typically, the sediment will have slight vegetation growing on it. | Sediment has resulted in a significant loss of channel conveyance, over 25%. Major vegetation is typical. |

The next block of the standardized inspection form pertains to the type, number, and condition of improvements already existing in the channel segment in question. A standardized rating scale of "not affected," "slightly affected," "moderately affected," and "highly affected" is provided for each improvement item identified. This block of the inspection form will preferably be completed in accordance with the standardized procedures and criteria set forth in Table IX.

TABLE IX

Instructions for Completing the Improved Channel Condition Block of the Standardized Reach/Segment Inspection Form Improved Channel (LF)

Each of the following man-made items found within the channel reach should be counted, and placed in the appropriate "condition state" category. In all cases (except "End of Concrete Channel"), count the length of the man-made element along the bottom and each side, in-line with the channel centerline. For example, there could be rip-rap on one channel side, interlocking blocks on the bottom, and a masonry retaining wall on the other channel side. Place the total length of each element in the appropriate classification. If an element is in perfect condition place that length in the "Not Affected" condition.

| | Not Affected | Slightly Affected | Moderately Affected | Highly Affected |
|---|---|---|---|---|
| Concrete Side Slopes Count the linear footage on each channel side. | Concrete generally in good condition. No significant cracks, joints typically in good condition. | Cracks visible, but generally not threatening the integrity of the side slopes. No significant separation or settlement. May be slight spalling visible. | Cracking or spalling visible thru the slab, may be some settlement, rotation, or shifting of slab. Bare earth may be visible, but slab still more or less in place. | Severe failure of slab, including rotation, settlement or shifting of broken or missing pieces of the slab. Bare earth and scour visible in large amounts due to failure of the slab. |
| Concrete Bottom Count the linear footage along the channel bottom. | Concrete generally in good condition, No significant cracks, joints typically in good condition. | Cracks visible, but generally not threatening the integrity of the slab. No significant separation or settlement. May be slight spalling visible. | Cracking or spalling visible thru the slab, may be some settlement, rotation, or shifting of slab. Bare earth may be visible, but the slab still more or less in place. | Severe failure of the slab, including rotation, settlement, or shifting of broken or missing pieces of the slab. Bare earth and scour visible in large amounts due to failure of slab. |
| End of Concrete Channel Count the linear footage of the exposed end of a concrete lining on the bottom of the channel. | Concrete end in good, stable condition. End is flush with flowline of channel. No settlement, spalling or cracking. | Face of concrete end exposed, but not undercut. May be slight cracking, but no significant separation or settlement of slab. | Concrete end is exposed and undercut by erosion. May be cracking, separation and settlement, but the end is generally serviceable. | Concrete end is separated, sagging, rotated, or otherwise has failed. Slab end has generally failed. |
| Trickle Channel Count the linear footage along the | Trickle channel generally in good condition | Cracks visible, but generally not threatening the | Cracking or spalling visible thru the trickle | Severe failure of the trickle channel including rotation, |

TABLE IX-continued

Instructions for Completing the Improved Channel Condition Block of the Standardized Reach/Segment Inspection Form

| | | | | |
|---|---|---|---|---|
| channel bottom | with no significant cracks, settlement or undercutting. | integrity of the trickle channel. No significant settlement or separation. | channel. May be some settlement, rotation, or shifting, but the trickle channel is generally serviceable. | settlement, or shifting of broken or missing pieces of the slab. Sections missing or completely failed. |
| Rip Rap Count the linear footage on each channel side and along the channel bottom. | Rip rap well positioned, and fully functional, No shifted, or missing pieces. | Slight shifting present or some missing pieces resulting in slight visible bare earth underneath. Rip rap generally serviceable and protecting as intended. | Wide areas of visible earth underneath due to shifting or missing pieces. The condition of the rip rap has resulted in scour of unprotected earth. | Rip rap generally failed, and not protecting the earth as intended. Bare earth with widespread scour visible. Shifted or missing pieces widespread. |
| Rip Rap Grouted Count the linear footage on each channel side and along the channel bottom. | Grouted rip rap well positioned, and fully functional. No shifting or missing pieces. Grout fully functional. | Slight cracking in the grout present, but no missing pieces. No significant separation or settlement. Footing may be exposed, but generally. serviceable. | Cracking of the grout has resulted in shifting, separation or undercutting of the rip rap. Bare earth and scour may be visible underneath. | Severe failure of the grout with widespread shifting, separation or undercutting of the rip rap. Bare earth and scour visible in large amounts due to failure of the grouted rip rap. |
| Gabion Count the linear footage on each channel side and along the channel bottom. Includes gabion mattress. | Gabions well aligned and fully functional. No settlement or rotation. | Gabions may show slight settlement, or undercutting but are generally serviceable. No rotation visible. | Sagging, bulging and/or rotation is present, but baskets are not torn or broken. Undercutting or erosion of foundation typical. | Gabion has failed. Sagging, rotation and/or bulging is widespread. Gabion baskets are separated or torn, spilling rocks. |
| Interlocking Blocks Count the linear footage on each channel side and along the channel bottom. | The vast majority of the blocks are well aligned and fully functional. No settlement, bulging or rotation of individual blocks. | Slight settlement or bulging is visible, but the individual blocks are still inter-connected. Individual blocks may be broken, but the whole system is generally serviceable. | Settlement or bulging has advanced to the point that some blocks are completely dislodged or missing. Bare earth is visible underneath. | Settlement or bulging has resulted in widespread failure of the system. Bare earth and scour is visible underneath with many blocks missing or broken. |
| Fabric Formed Concrete Count the linear footage on each channel side and along the channel bottom. | Mattress shows no cracking, settlement or bulging. | Slight cracking or patches visible. No settlement or bulging visible. Footing may be slightly undercut. | Cracking thru the mattress resulting in settlement or shifting of pieces. Mattress pieces still in place providing protection, but scour may be visible underneath. | The mattress system has failed. There are missing or rotated pieces of mattress resulting in scour of bare earth underneath. |
| Retaining Wall, Concrete Count the linear footage on each channel side. | No defects visible. No cracks in the wall. No settlement or undercutting of the footing. | Cracks may be visible in the wall. No bulging or sagging. Footing may be. exposed, but undercutting is slight, and footing is well founded. | Cracks are visible in the wall. Sagging or bulging is present, but the wall has not failed. Footing may be undercut, cracked or partially failing. | Retaining wall has rotated so much, or cracks, sagging or bulging is so severe that the wall has failed, or is in immediate danger of failure. |
| Retaining Wall, Masonry Count the linear footage on each channel side. | No defects visible. No cracks in the wall. No settlement or undercutting of | Cracks may be visible in the wall. No bulging or sagging. Footing may be exposed, but | Cracks are visible in the wall. Sagging or bulging is present, but the wall has not failed. Footing may be | Sagging or bulging has progressed to the point that the retaining wall has failed. Masonry blocks are |

TABLE IX-continued

Instructions for Completing the Improved Channel Condition Block of the Standardized Reach/Segment Inspection Form

| | the footing. | undercutting is slight, and footing is well founded. | undercut, cracked or partially failing. | dislodged, missing or collapsed. |
|---|---|---|---|---|
| Retaining Wall, Timber Count the linear footage on each channel side. | All timber in good condition. Good foundation. No sagging or bulging. | Some loose, split or rotting timbers. Foundation may be suspect. No sagging or bulging. | Sagging and/or bulging is present. Majority of timbers may be loose, split or rotting. Undercutting or erosion of foundation typical. | Sagging or bulging has progressed to the point that the retaining wall has failed. Timbers are dislodged or broken. |
| Other | Note type and condition state of other improved channel elements not listed above. Use the "Comments" section on the Form to provide more detail. | | | |

The data collected for all of the segments of the channel system will preferably be stored in a database created using Microsoft Access or other suitable software. The database will preferably contain one record for each of the channel segments. In addition to storing the data recorded on the inspection forms, the database will also preferably allow the user to include pictures taken during the field inspection and to view, query, and sort the data and generate reports using generally any criteria and format desired.

In order to facilitate and provide a reliable, standardized basis for categorizing and prioritizing all of the segments of the channel system based upon their respective condition states, a standardized channel condition index value is preferably calculated for each of the individual channel segments. The standardized channel index value will preferably be determined based upon the various items identified on the inspection form for the channel segment in question. This will preferably be accomplished by applying standardized weighting multipliers to each of the items identified on the inspection form for the channel segment in question and then totaling the resulting set of weighted item values for the segment.

Although not necessary, it is also most preferred that the standardized weighting multipliers account for the different scale ratings which are applicable to at least most of the items listed on the reach inspection form. It is also preferred that the determination of the standardized channel condition index value include the step of dividing the sum of the weighted item values for the channel segment by the length of the channel segment.

As will be understood, the standardized weighting multipliers employed in the inventive method reflect the relative significance of the various items listed on the inspection form and preferably also account for the different scale ratings applied thereto. Thus, the resulting standardized channel condition index value for each channel segment is representative of the relative overall condition of the channel segment as well as the significance of the particular inventory elements pertaining thereto. Table X provides an example of a standardized set of weighting multipliers which might be used for the inventory items set forth on the standardized inspection form.

TABLE X

Example Of Standardized Weighting Multipliers For Inspection Form Elements

Number of Adjacent Overbank Properties Affected by Channel Condition

| | MULTIPLIERS | | |
|---|---|---|---|
| | Slightly Affected | Moderately Affected | Highly Affected |
| Houses | 25 | 50 | 100 |
| Apartments Condo Buildings | 25 | 50 | 100 |
| Detached Garages/Out Buildings | 10 | 20 | 40 |
| Yards | 10 | 20 | 40 |
| Fences | 5 | 10 | 20 |
| Other Appurtenances | 5 | 10 | 20 |
| Commercial/Industrial Buildings | 25 | 50 | 100 |
| Public Buildings | 25 | 50 | 100 |
| Other Buildings | 25 | 50 | 100 |
| Parking Lots | 10 | 20 | 40 |

Number of Infrastructure Items Affected by Channel Conditions

| | MULTIPLIERS | | | |
|---|---|---|---|---|
| | Not Affected | Slightly Affected | Moderately Affected | Highly Affected |
| Side Headwall/Outfall | 0 | 1 | 2 | 4 |
| Weir/Blocks/Drop | 0 | 1 | 2 | 4 |
| Roadway (LF) | 0 | 1 | 2 | 4 |
| Bridge Abutment | 0 | 10 | 20 | 40 |
| Bridge Pier | 0 | 10 | 20 | 40 |
| Culvert Wingwall | 0 | 1 | 2 | 4 |
| Culvert Apron/End | 0 | 1 | 2 | 4 |
| Pipe Culvert | 0 | 10 | 20 | 40 |
| Low Water Crossing | 0 | 10 | 20 | 40 |
| Other Structure | 0 | 1 | 2 | 4 |

| | MULTIPLIERS |
|---|---|
| | Public Utilities |
| Sanitary Sewer Line Exposed | 2 |
| # of San. Sewer Manholes Exposed | 2 |
| Water Line Exposed | 2 |

-continued

| MULTIPLIERS | |
|---|---|
| Private Utilities | |
| # of Gas Line Exposures | 1 |
| # of Electric Line Exposures | 1 |
| # of Other Util. Exposures | 1 |

| Channel Conveyance Condition | |
|---|---|
| MULTIPLIERS | |
| # of Trees with Exposed Roots | 1 |
| # of Trees in Immediate Danger of Falling | 2 |
| # of Trees Down in Channel | 4 |

| | MULTIPLIERS | | |
|---|---|---|---|
| | Slight | Moderate | Severe |
| Trees/Brush/Undergrowth Impeding Flow (LF) | 1 | 2 | 4 |
| Drift Accumulation Impeding Flow (LF) | 1 | 2 | 4 |
| Bank Erosion/Scour (LF) | 1 | 2 | 4 |
| Bottom Scour (LF) | 1 | 2 | 4 |
| Sediment Deposition (LF) | 1 | 2 | 4 |

| Improved Channel Condition (LF) | | | | |
|---|---|---|---|---|
| | MULTIPLIERS | | | |
| | Good Condition | Slight Defects | Moderate Defects | Severe Defects |
| Concrete Side Slopes | 0 | 1 | 2 | 4 |
| Concrete Bottom | 0 | 1 | 2 | 4 |
| End of Concrete Channel | 0 | 1 | 2 | 4 |
| Trickle Channel | 0 | 1 | 2 | 4 |
| Rip Rap | 0 | 1 | 2 | 4 |
| Rip Rap, Grouted | 0 | 1 | 2 | 4 |
| Gabion | 0 | 1 | 2 | 4 |
| Interlocking Blocks | 0 | 1 | 2 | 4 |
| Fabric Formed Concrete | 0 | 1 | 2 | 4 |
| Retain Wall, Concrete | 0 | 1 | 2 | 4 |
| Retain Wall, Masonry | 0 | 1 | 2 | 4 |
| Retain Wall, Timber | 0 | 1 | 2 | 4 |
| Other | 0 | 1 | 2 | 4 |

As will be understood by those in the art, the weighting multipliers employed in the inventive method for calculating standardized channel condition index values from the inventory data can be derived using factors such as the relative costs for servicing, repairing, or replacing the items in question, the item conditions, (e.g., slight, moderate, severe, etc.), the relative effect of the items on flow conditions, the relative urgency of the items based upon other factors such as typically rates of further deterioration, effects on adjacent properties, utilities, etc., or any other factors, history, experience, etc., available.

By way of example, Table XI demonstrates the calculation of the standardized channel condition index value of a particular channel segment. The segment is 920 feet in length and it has been determined using the standardized inspection procedure that the reach includes the following items: 5 trees with exposed roots; 30 linear feet of slight bank erosion/scour; 10 linear feet of moderate bank erosion/scour; 400 linear feet of slight bottom scour; 900 linear feet of slight tree/brush/undergrowth impeding flow; and 20 linear feet of slight drift accumulation impeding flow. Using the standardized weighting multipliers set forth in Table X, the weighted total for all of the inventory items identified for this channel segment is 1375. This value is preferably divided by the total length of the segment to yield a standardized channel index value of 1.495.

TABLE XI

Example Calculation Of The Standardized Channel Condition Index Value For A Channel Segment

| Item | Value | Multiplier | Total |
|---|---|---|---|
| # of Trees with Exposed Roots | 5 | 1 | 5 |
| Bank Erosion/Scour - Slight (LF) | 30 | 1 | 30 |
| Bank Erosion/Scour - Moderate (LF) | 10 | 2 | 20 |
| Bottom Scour - Slight (LF) | 400 | 1 | 400 |
| Trees/Brush/Undergrowth Impeding Flow - Slight (LF) | 900 | 1 | 900 |
| Drift Accumulation Impeding Flow - Slight (LF) | 20 | 1 | 20 |
| Total Condition | | | 1375 |
| Segment Length | | | 920 |
| Standardized Channel Segment Condition Index Value | | | 1.495 |

As mentioned above, in addition to providing significant assistance and direction for identifying and prioritizing needed service, maintenance, and improvement projects, the inventive method can also greatly assist the community or other entity in more accurately and thoroughly mapping its storm water or other open channel systems. The geometry or line representations of the creeks or other channels can be input from a variety of sources. CAD software packages such as AutoCAD or MicroStation, or a geographic information system (GIS) package such as ArcGIS or Geomedia, are well suited for inputting this information. At the beginning of the project, or when adding new reaches or segments, one way to start is to obtain a digital detailed creek network from a municipal website or through the local government's GIS or engineering office. Another method is to obtain aerial photos or USGS topographical maps of the area and digitize the creeks to be studied (using, e.g., CAD or GIS).

In order to identify each creek within the database, a naming convention of the type described above will preferably be used. Many creeks have drainage basins associated with them that can be used to subdivide the creek into segments. These basin networks can be used to name the creeks according to the procedure described. As noted, further subdivisions may typically be made based upon channel conditions in the field. It is also important to provide clear guidelines to the field inspector for naming the segments being studied in the survey.

Once the base creek mapping has been laid out, the field mapping can begin. GIS lends itself well to setting up the field maps for this task because of its ability to make indexed map books. Map scales ranging from 1:100 to 1:200 are typically appropriate for the level of detail needed to adequately inventory segment conditions. These maps can show the part of the channel being surveyed with the overall channel stationing and other features to help guide the surveyor. The channel stationing may also be used as an aid for estimating lengths in the field. Utility locations, floodplain extent, street names, and drainage boundaries can help the surveyor determine his location on the map and therefore the stationing of the upstream and downstream ends of the channel segments.

After the field work is complete, and the maps have been annotated to illustrate the breaks and the different types of channels, the data can be converted to a GIS format. The beginning stages of generating the data for the channel inventory can be done, for example, in CAD or GIS. GIS databases are preferred for properly connecting the creek geometry on the map with the channel management system database records for custom map creation. Most GIS software can readily import CAD data and then convert it to the native format of the GIS software. Once the data is in GIS format, each segment that has been detailed in the channel management system database will preferably have its own line segment with a segment I.D. in the attribute table that matches the flood management area and the segment I.D. in the channel management system database.

For each channel segment, there will preferably be a line in the GIS file containing a link that matches a record to the CMS database. For example, if the channel segment is listed in the CMS database as SC-01-B, the geometry will preferably have a single creek segment with an attribute that matches that identification. Most GIS software packages will allow for a joining of the data between the shape file geometry and an outside database via a dynamic link which will correspond to the flood management area and the channel segment identification. In the GIS, the creek segments can be queried and information about the channel from the separate CMS database can be viewed. Changes made to the database can be recognized in the GIS once the geometry is queried.

In the form view of the CMS database, there will preferably be a snapshot of the channel segment geometry with an aerial photo behind it. In order to generate these snapshots, a channel segment map-book can be created. By way of example, this data can be built using the map-book function in ArcGIS by the steps of: buffering each segment by one foot to create a polygon layer that contains the attributes of the segment; using the polygon layer to create an index layer for the map-book; adding aerial photos and other snapshots to the ArcGIS project; setting up the ArcGIS with a map-book to export a named JPG format image for each segment in the database using the flood management area and channel segment identification; and organizing these images by basin and placing them in a folder entitled "Channel Segment Locator" under their respective creeks.

In addition to the creek identification in the GIS data, other attributes of the channel segment can be incorporated into the geometry's associated table. For example, if a municipality wants the ability to determine which channel segments would be part of future capital investment projects, each channel segment located in a current or proposed capital improvement can be given a link to the named project as an attribute. In addition to the relevant attributes, photos taken in the field can be attached to the GIS data to allow for a quick link to the pictures from the GIS software.

Also in accordance with the present invention, the detailed data generated by the inventive inspection and evaluation method can be incorporated in and visualized as a part of the system mapping using GIS. Live links can be established for viewing the standardized channel condition values as part of the GIS mapping. For example, ranges of standardized channel condition index values can be color coded to distinguish which channel segments are in the best or worst condition. For example, channel segments which are in poor condition and therefore have a standardized channel condition index value of greater than 7 can be shown in red. Channel segments which have standardized channel index values in the range of from 4 to 7 and are therefore in fair condition can be shown in yellow. Finally, channel segments which have standardized channel condition index values of less than 4 and are therefore in good condition can be shown in green.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within the spirit of this invention as defined by the claims.

What is claimed is:

1. A method of managing a system of open channels for channel evaluation, servicing said open channels, maintaining said open channels, improving said open channels, or a combination thereof, said method comprising the steps of:
   (a) dividing said system of open channels into a plurality of channel segment lengths for evaluation;
   (b) conducting for each said channel segment length an inventory based upon a standardized set of items to identify any and each of said items existing in said channel segment length; and
   (c) determining a standardized channel condition index value for each said channel segment length based upon said items existing in said channel segment length.

2. The method of claim 1 wherein:
   said method further comprises the step of assigning ratings to at least a portion of said items existing in said channel segment lengths based upon standardized ratings scales and
   said standardized channel condition index value determined in step (c) for each said channel segment length is based upon said items existing in said channel segment length and said ratings assigned to said portion of said items.

3. The method of claim 2 wherein said step of determining said standardized channel condition index value for each said channel segment length further includes applying standardized weighting multipliers to said items existing in said channel segment length to provide a set of weighted item values for said channel segment length.

4. The method of claim 3 wherein said standardized weighting multipliers applied to said portion of said items are dependent upon said ratings assigned to said portion of said items.

5. The method of claim 4 wherein said step of determining said standardized channel condition index value for each said channel segment length further comprises calculating a total of said set of weighted item values for said channel segment length.

6. The method of claim 5 wherein said step of determining said standardized channel condition index value for said channel segment further comprises dividing said total of said set of weighted item values for said channel segment length by a length of said channel segment length.

7. The method of claim 1 wherein said step of determining said standardized channel condition index value for each said channel segment length further includes applying standardized weighting multipliers to said items existing in said channel segment to provide a set of weighted item values for said channel segment length.

8. The method of claim 7 wherein said step of determining said standardized channel condition index value for each said channel segment length further comprises calculating a total of said set of weighted item values for said channel segment length.

9. The method of claim 8 wherein said step of determining said standardized channel condition index value for said channel segment further comprises dividing said total of said set of weighted item values for said channel segment length by a length of said channel segment length.

10. The method of claim 1 further comprising the step of ranking said channel segment lengths according to said standardized channel condition index values determined for said channel segment lengths in step (c).

11. The method of claim 1 wherein said standardized set of items comprises at least one natural channel condition.

12. The method of claim 11 wherein said natural condition is an erosion condition.

13. The method of claim 11 wherein said natural condition is a tree, brush, or undergrowth condition.

14. The method of claim 1 wherein said standardized set of items comprises at least one channel improvement condition.

15. The method of claim 1 wherein said standardized set of items comprises at least one adjacent overbank properties condition.

16. The method of claim 1 wherein said standardized set of items comprises at least one infrastructure condition.

17. The method of claim 1 wherein said standardized set of items comprises at least one utilities condition.

18. A method of managing a system of open channels comprising the steps of:
   (a) dividing said system of open channels into a plurality of channel segment lengths;
   (b) conducting for each said channel segment length an inventory based upon a standardized set of items to identify any and each of said items existing in said channel segment length; and
   (c) assigning ratings to at least a portion of said items existing in said channel segment lengths based upon standardized ratings scales and instructions.

19. The method of claim 18 wherein said standardized set of items comprises at least one natural channel condition.

20. The method of claim 19 wherein said natural channel condition is an erosion condition.

21. The method of claim 19 wherein said natural channel condition is a tree, brush, or undergrowth condition.

22. The method of claim 18 wherein said standardized set of items comprises at least one channel improvement condition.

23. The method of claim 18 wherein said standardized set of items comprises at least one adjacent overbank properties condition.

24. The method of claim 18 wherein said standardized set of items comprises at least one infrastructure condition.

25. The method of claim 18 wherein said standardized set of items comprises at least one utilities condition.

* * * * *